July 16, 1940.  D. M. SMITH  2,208,529
PISTON EXPANDER
Filed Jan. 6, 1940
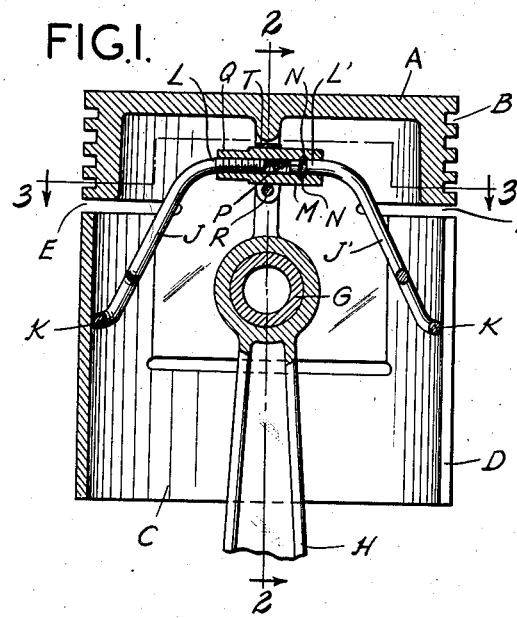
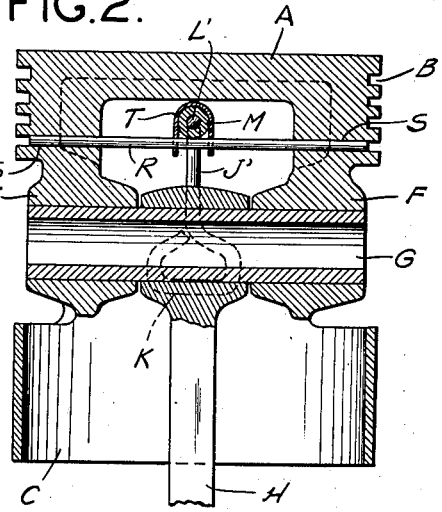
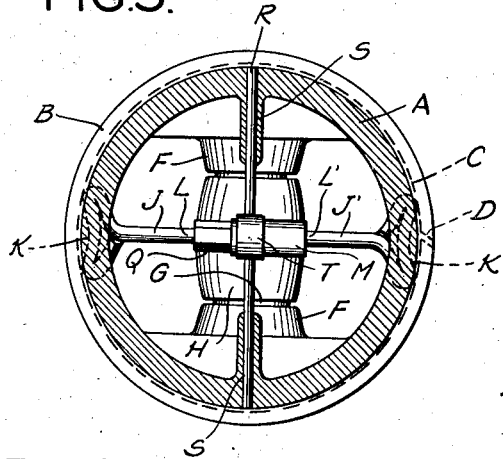
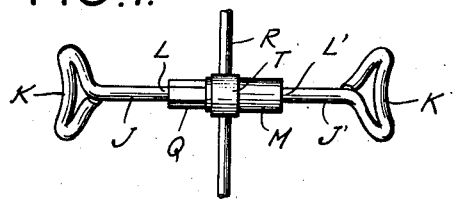
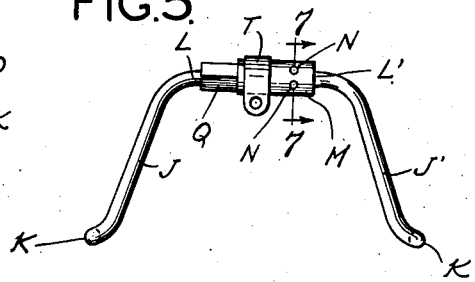
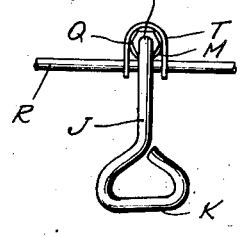
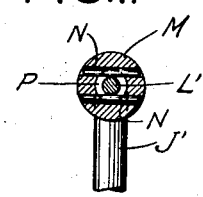
INVENTOR:
DALLAS M. SMITH,
By J. Henry Kinsely.
ATTORNEY.

Patented July 16, 1940

2,208,529

UNITED STATES PATENT OFFICE 2,208,529

PISTON EXPANDER

Dallas M. Smith, Kirkwood, Mo., assignor to McQuay-Norris Manufacturing Company, St. Louis, Mo., a corporation of Delaware Application January 6, 1940, Serial No. 312,750

3 Claims. (Cl. 309—12)

My invention relates to piston expanders and more particularly to piston expanders of the type heretofore described by me in a co-pending application for United States Letters Patent and comprising a pair of legs adapted to be mounted in the hollow interior of a piston to engage the piston skirt and arranged whereby the legs are movable away from or toward one another to increase or decrease the distance between their skirt engaging portions so that the expansive force exerted against the piston skirt to increase its effective diameter may be adjusted.

One of the important features of a piston expander of the type just described and as heretofore invented by me is the means for moving the legs relative to one another and for maintaining the legs in predetermined adjusted position. In my application heretofore filed, I have shown several embodiments in which this relative movement of the legs of an expander of this type may be effected. However, in this application I contemplate an additional simple and efficacious method by which the legs may be so adjusted.

Therefore, the objects of this invention are to provide the combination with an expander of the type above mentioned of means for moving the legs comprised therein relative to one another and for maintaining the legs in adjusted position.

In the accompanying drawing wherein similar characters are used to designate similar parts, I have shown one embodiment of my new and improved device. In the drawing Fig. 1 is a section through a piston including the expander; Fig. 2 is a section along the lines 2—2 in Fig. 1; Fig. 3 is a cross section along the lines 3—3 in Fig. 1; Figs. 4, 5 and 6 are views of the expander removed from the piston; and Fig. 7 is a section along the lines 7—7 in Fig. 5.

Referring to the figures the piston shown therein as including an expander made according to my invention comprises the usual head A including a ring belt B and a split skirt C having an axially extending slot D and separated from the head throughout a major portion of its circumference by peripherally extending slots E. The piston also has opposed pin bosses F arranged to receive a wrist pin G upon which is mounted the connecting rod H.

Any embodiment of my expander of the type shown herein has a pair of legs J and J' formed of spring material and each having a portion K adapted to engage the inner surface of the piston skirt, preferably, at substantially diametrically opposed points. In the form shown herein the legs J and J' are formed of spring wire and the portions K are formed by a loop of wire arranged at the lower end of each leg.

As stated above, in order to adjust the legs J and J' to increase or decrease the distance between the skirt engaging portions K it is necessary to provide means whereby the legs may be moved toward or away from one another and in the device here shown this construction is as follows: The upper ends of the legs J and J' are bent to form straight portions L and L', respectively, arranged to be moved into axial alignment. A tubular part M is mounted on the straight portion L' so as to be freely rotatable thereabout and is arranged to receive and have threaded engagement with the threaded end of the straight portion L on the other leg. Obviously, when the part M is turned the portions L and L' will be brought closer together or separated, according to the direction in which the part M is rotated, and, in turn, the legs J and J' and the skirt engaging portions K will be moved away from or toward one another to effect adjustment of the expander.

Of course, the part M must be maintained in predetermined axial position on the straight portion L' and must be prevented from moving therealong. In this embodiment the part M is so maintained by a pair of pins N extending therethrough tangentially of the straight portion L' and arranged to engage the walls of an annular groove P formed in this straight portion, all as shown in Figs. 5 and 7. Preferably, a portion of the part M is cut as at Q to provide annular surfaces for engagement by a wrench when the part is to be rotated to adjust the expander.

When the expander is placed in the piston I prefer that the portions K engage the skirt at points removed substantially ninety (90°) degrees from the pin bosses so that the skirt will be expanded along a line substantially at a right angle to the wrist pin. If the legs J and J' are positioned as shown in the drawing to form a U-shaped expander and if the expander is placed in the piston with the upper part thereof above the bosses F and wrist pin G the expander may stay in place after it is adjusted. However, in order to avoid accidental dislodgement of the expander I prefer that it be mounted on the head of the piston. In this embodiment, the expander is so mounted on a rod R extending across the hollow interior of the head and having its ends arranged in holes S drilled at diametrically opposed points in the bottom of the lower ring groove of the ring belt B. A strap T passes over the top of a circular portion of the part M and then has the ends thereof apertured to receive the rod R. Of course, any other method may be used to mount the expander in the piston and my present invention contemplates only the structure for adjusting the legs J and J'.

I do not propose to limit myself to the details of construction shown in the drawing because the size and arrangement of the legs J and the other parts described herein may be varied within wide limits without deviating from the spirit of my invention as included in the appended claims.

What I claim as new and desire to secure by Letters Patent, is:

1. A piston expander comprising a pair of legs movable relative to one another, each of said legs terminating in a straight portion arranged in axial alignment with the straight portion of the other of said legs, one of said straight portions carrying a part freely rotatable thereon, means for preventing said rotatable part from moving axially of the straight portion on which it is mounted, and said part having a threaded engagement with the straight portion on the other of said legs whereby rotation of said part will cause said legs to move away from or toward one another.

2. A piston expander comprising a pair of legs movable away from or toward one another, each of said legs having a portion adapted to engage the piston skirt and each of said legs terminating at its upper end in a straight portion in axial alignment with the straight portion of the other of said legs, one of said straight portions carrying a part freely rotatable thereon, means for preventing said rotatable part from moving axially of the straight portion on which it is mounted, and said part having a threaded engagement with the straight portion on the other of said legs whereby rotation of said part will cause said legs to move away from or toward one another whereby said expander may be adjusted.

3. A piston expander comprising a pair of legs movable relative to one another, each of said legs terminating in a straight portion arranged in axial alignment with the straight portion of the other of said legs, one of said straight portions carrying a part freely rotatable thereon, means for preventing said rotatable part from moving axially of the straight portion on which it is mounted, and said part having a threaded engagement with the straight portion on the other of said legs whereby rotation of said part will cause said legs to move away from or toward one another, a strap having openings therein engaging said part and a rod passing through said openings and secured within the piston head.

DALLAS M. SMITH.